United States Patent [19]
Rosenberg

[11] 3,882,487
[45] May 6, 1975

[54] ALL DIGITAL SAMPLING SERVO SYSTEM
[76] Inventor: Jack Rosenberg, 808 Bienveneda Ave., Pacific Palisades, Calif. 90272
[22] Filed: Nov. 29, 1973
[21] Appl. No.: 419,903

[52] U.S. Cl............ 340/347 DA; 235/151.11; 340/347 SY
[51] Int. Cl..................... G08c 11/00; H03k 13/02
[58] Field of Search.......... 235/151.11; 340/347 SY, 340/347 DA; 318/571, 608

[56] References Cited
UNITED STATES PATENTS

| | | | |
|---|---|---|---|
| 3,325,633 | 6/1967 | Lukens | 235/151.11 |
| 3,430,035 | 2/1969 | Read | 235/151.11 |
| 3,512,064 | 5/1970 | Okamoto et al. | 318/18 |
| 3,539,896 | 11/1970 | Reuteler et al. | 318/571 |
| 3,612,976 | 10/1971 | Tripp | 318/603 |
| 3,633,013 | 1/1972 | Dummermuth | 235/151.11 |
| 3,665,280 | 5/1972 | Payne et al. | 318/572 |
| 3,676,650 | 7/1972 | Henegar | 235/151.11 |
| 3,725,651 | 4/1973 | Cutler | 235/151.11 |
| 3,731,175 | 5/1973 | Hartung | 318/570 |
| 3,739,158 | 6/1973 | Woodward | 235/151.11 |

Primary Examiner—Charles E. Atkinson
Assistant Examiner—Vincent J. Sunderdick
Attorney, Agent, or Firm—Lindenberg, Freilich, Wasserman, Rosen & Fernandez

[57] ABSTRACT

A numerical machine tool control system is provided wherein command information is given in the form of digital words representative of end point coordinates to which the machine tool is expected to move within predetermined identical increments of time, as opposed to the present system which provides command information together with a feedrate.

9 Claims, 3 Drawing Figures 3,882,487

ALL DIGITAL SAMPLING SERVO SYSTEM

BACKGROUND OF THE INVENTION

This invention relates to numerical machine tool control system and more particularly to improvements therein.

The mass and stiffness required to produce accuracy and rigidity, as required in a modern machine tool, cause the machanical part of the servo, including servo motor, lead screw and gear box, and the machine tool slide and its work load, to act like a filter which has an upper cutoff filter frequency (fco), of from one to six cycles per second. Above the cutoff frequency the servo filter attenuates its response to motion commands at a rate of at least 12 db per octave. A typical production machine tool has a cutoff of two cycles per second and an attenuation of 18 db per octave above the cutoff frequency.

When, for example, such a servo receives alternate, positive and negative displacement commands every one-twentieth of a second, so that the total command period is one-tenth of a second, the slide remains absolutely stationary. This proves that the servo filter integrates displacement commands. It also means that any command input or sampling rate above 10 commands per second will produce no motion versus time, different from that which occurs at 10 commands per second. In other words, the servo cannot physically respond to commands occuring more frequently than 10 samples per second. Thus, present day systems which provide sampling rates or inputs to the servo system of, on the order of, 30,000 per second, generate and process data at a far higher rate than physically necessary or electrically desirable. Further, because of the necessity for providing equipment which can process signals at the high frequency rate indicated, the cost of the equipment is in excess of that which is actually required for processing signals at a low frequency rate.

OBJECTS AND BRIEF SUMMARY OF THE INVENTION

An object of this invention is to provide a numerical control system which is less expensive and less complex than present day numerical control systems.

Another object of this invention is the provision of a novel numerical control system.

Yet, another object of the invention is the provision of an improved numerical control system which processes control data at a far lower rate than present day systems with, however, just as accurate results.

These and other objects of the invention are achieved in a system in which, for a given path along which the machine tool slides should move, motion command numbers, indicative of the end point coordinates of increments of said path to which the machine tool should move are calculated and are then presented to the control system at a sampling rate which is constant. However, each sample contains a digital value which has been determined, amongst other factors, by the intended velocity. Thus, for a servo with $f_{co} = 2$ cps, for each one-tenth of a second there is calculated how far each slide should be displaced from its previous location. This number is then presented to the servo system and is indicative of the displacement to be accomplished in one-tenth of a second.

DESCRIPTION OF THE PREFERRED EMBODIMENTS

Figure 1:
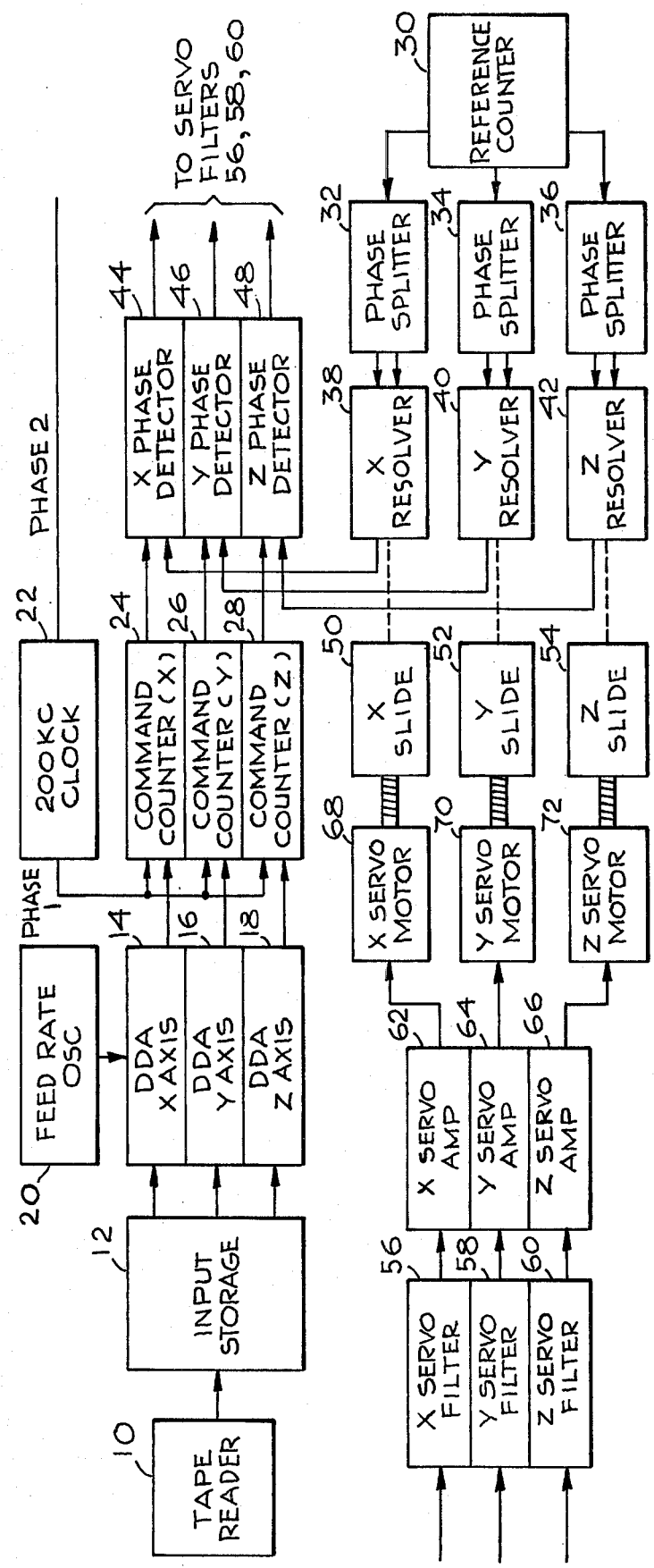
FIG. 1 is a simplified block schematic diagram illustrating an interpolator employed in present day numerical control systems.

Referring now to FIG. 1, there may be seen a simplified schematic diagram of an interpolator used for a numerical control system. This arrangement is an illustration of the type of system presently being used, and is shown for the purpose of providing a better understanding of this invention. Data indicative of the end point of a particular path segment, which includes the X, Y and Z axis information, is read from a tape reader 10 into an input storage system 12. The input storage system supplies this information to the respective X, Y and Z axis digital differential analyzers, respectively 14, 16 and 18, which are driven, in response to a feed rate oscillator 20, to provide representative pulse trains as their outputs. These outputs are known as the X, Y and Z motion command pulse trains and they are added to or subtracted from the output of a 200 kilocycle clock pulse source 22, by the respective command counters 24, 26 and 28, for the respective X, Y and Z axes. Effectively, the 200 kc clock is a square wave carrier to which the motion command pulses are added or subtracted.

A reference counter 30, also receives 200 kc clock pulses and divides these by a factor of 1,000 so that its output is a 200 cps square wave. Each of the command counters, 24, 26 and 28, also divide their inputs by 1,000. The clock pulses at a fixed frequency of 200 kc are spaced 5 microseconds apart from each other and the output of the reference counter, which has a time period of 1,000 × 5 microseconds, produces fixed frequency output square waves with a 5,000 microsecond period.

Since motion command square waves fed into the command counter are merged with the clock pulses, whereby a positive command adds one count to the total of the counter and a negative command deletes a clock pulse or cancels its effect on the counter, each command square wave advances or retards the counter activity by 5 microseconds. This causes the output signal from the counter, nominally a 200 cps square wave with a 5,000 microsecond period, to be advanced or retarded with respect to the reference counter output wave by 5 microseconds per command pulse.

The output from the reference counter 30 is applied to three phase splitters, respectively 32, 34 and 36, for the respective X, Y and Z axes. The output of these three phase splitters is used to excite the fields of the respective X resolver 38, Y resolver 40 and Z resolver 42.

The output of the X, Y and Z resolvers respectively drive X, Y and Z phase detectors, respectively 44, 46 and 48. The other input to these phase detectors constitutes the outputs from the respective command counters 24, 26 and 28.

The phase detectors detect the difference in phase between the X, Y and Z resolvers, which are mechanically driven by the respective X slide, 50, the Y slide, 52, and the Z slide, 54, and respective command counters 24, 26, and 28. Thus, the resolvers produce an output representative of the present phase of position of the machine tool slides. The phase detectors detect the difference between the position of the machine tool slide and the command counter outputs, and applies these outputs to the servo filters, respectively 56, 58 and 60, for the X, Y and Z servo amplifiers, respectively 62, 64 and 68. The outputs from the servo amplifiers drive the respective X servo motor, 68, Y servo motor, 70, and Z servo motor, 72. The respective X, Y and Z servo motors drive the X, Y and Z slides, respectively 50, 52 and 54.

As long as signals are received by the command counter from the respective digital differential analyzers for the respective X, Y and Z axes, the outputs from the command counters will vary in response to these signals, in phase with respect to the reference counter, and the phase difference, constituting an error signal, is detected by the phase detectors and used to drive the servo motors. When the command counters no longer receive signals from the digital differential analyzers, the outputs will constitute 200 cps signals having the same phase as the resolver 200 cps signals and the slides will come to a stop.

Now, in a system, such as is used today, which has an electrical resolution of 0.0001 inch, at a feed rate of 1 inch per second, command pulses are produced at the rate of 10,000 pulses per second, or one pulse each 100 microseconds. During each 5,000 microseconds, (the nominal period of the output of the command counter), 50 command pulses would be inserted at the counter input in addition to the clock pulses. Therefore, the output from the counter would be advanced by 50 × 5 microseconds or 250 microseconds from the nominal or unmodulated output. For a feed rate of 3 inches per second, the time shift will be 750 microseconds during each 5,000 microsecond output of the reference counter.

Because a phase detector can recognize the output of the command only when it undergoes a transition, only the positive and negative zero crossings of the output waveform provide any information to the detector. The phase detector recognizes only when the last or highest order stage of the command counter changes from zero to the one condition (counter total equal 500), and when the last stage changes from the one to the zero, (counter total equals 1,000 equals zero). This leads to an inherent time inaccuracy of the command counter. Each command pulse produced by an interpolation DDA, is inserted within one clock period (5 microseconds) into the appropriate command counter. But the state of the command counter is indeterminate at this time. It may have accumulated a previous count of 499, a count of 1,000 or zero, or any value between zero and 1,000.

If the counter has just been reset to zero and a single command pulse is inserted, the command pulse will have no effect on the output wave zero crossing until 2,495 microseconds later. On the other extreme, if the counter has a content of 499 or 999, the output zero crossing will occur as soon as the command pulse is inserted. Thus, there is a delay of an uncertain amount of time from zero to 2,495 microseconds between when a command pulse occurs and when the phase detector can recognize the effect of the command pulse. This is a time skew which can result in spatial error, between the various servo axes of a single machine tool if a different delay is caused on each axis.

Besides the time skew, the system described also generates commands to the servo motors at rates far in excess of those that can be used, as indicated previously. Also, in the system described, should a command pulse be lost or dropped, there is no way of detecting this, and more importantly, for correcting for such a lost pulse. The system just keeps on going in response to the input command numbers.

Given the perameters of a straight line in X, Y and Z space, which must be followed by the machine tool servos, and the velocity or feed rate desired, it is quite simple to calculate the amount of displacement each servo should produce for each increment of time to which each servo is capable of responding. As previously indicated, in view of the low band pass performance of the servos, if the servo is instructed with the absolute location or end point to which it should move the slides at the end of each one-tenth of a second, the information is provided above the top rate at which the servo can process the information, which is far below the sampling rate for present day machinery, and yet, the surface finish of the work piece being processed is not affected. Therefore, accuracy is achieved at a much lower sampling rate.

An existing data processing program for numerical control tape preparation, such as APT, (Automatically Programmed Tool), now produces as its output (called a CL, i.e., center path line, tape) a set of absolute coordinates representing the X, Y and Z position of the machine tool slide at the end of each linear segment over the entire machining program.

In order to compute the absolute locations for each servo for each one-tenth of a second, in accordance with this invention, let it be assumed that the coordinates at the start of the part program are $X_0$, $Y_0$ and $Z_0$. The coordinates at the end of the first segment shall be $X_1$, $Y_1$ and $Z_1$. For the $n$th segment the end coordinates will be $X_n$, $Y_n$ and $Z_n$. In the APT CL tape, for each segment there is entered by the part programmer a desired feed rate FR. In the present consideration, $FR_N$ is a vector velocity, which is the feed rate along the actual line in space.

The length of the $n$th segment to be taken can be determined from the following equation:

$$L_n = \sqrt{(X_n - X_{n-1})^2 + (Y_n - Y_{n-1})^2 + (Z_n - Z_{n-1})^2}$$

Next, the length of the time $T_n$ required to execute the $n$th segment is calculated, where $FR_n$ is the feed rate in inches per second. $T_n = L_n/FR_n$ seconds.

If the sample rate to the servos is 10 per second, then $10T_n$ is the total number of samples required to execute the $n$th segment.

Next, the displacement sample for the respective axis servos must be calculated. Thus, $DX_n = (X_n - X_{n-1})/10T_n =$ the displacement of the X servo during each 1/10 second sample interval.
$DY_n = (Y_n - Y_{n-1})/10T_n =$ the displacement of the Y servo during each 1/10 second sample interval.
$DZ_n = Z_n - Z_{n-1}/10T_n =$ the displacement of the Z servo during each 1/10 second sample interval.

These quantities, $DX_n$, $DY_n$ and $DZ_n$, are constant during the execution of the $n$th segment.

Finally, it is necessary to complete the interpolation process by calculating the absolute coordinates of the respective servos at the end of each sample interval as follows:

$X_{n-1} + DX_n = X_{S1}$ = the absolute coordinate of the X servo at the end of the first sample interval of the $n$th segment.

$Y_{n-1} + DY_n = Y_{S1}$ = the absolute coordinate of the Y servo at the end of the first sample interval of the $n$th segment.

$Z_{n-1} + DZ_n = Z_{S1}$ = the absolute coordinate of the Z servo at the end of the first sample interval of the $n$th segment.

For the next sample interval, the coordinate of the X servo is calculated as $X_{S2} = X_{n-1} + 2DX_n$. The Y and Z servo coordinates are calculated in similar fashion. This process is continued for a total of $10T_n$ times, so that the $n$th segment has been interpolated when $10T_n$ samples, equal to $10T_n DX_n = X_n - X_n - 1$, have been produced.

It will be apparent that the foregoing calculations can be readily performed by calculators or computers and the results thereof stored sequentially in a memory or in a tape so that they may be called out when necessary. As a matter of fact, with the present high speed calculators which are available, a program can be readily implemented whereby storage requirements are minimized. This merely requires storage of the path coordinates, $X_0, Y_0, X_0; X_1, Y_1, Z_1; X_n, Y_n, Z_n$. The calculator can then readily generate from this information sufficient one-tenth of a second samples to be ahead of the command requirements for the machine tool, without storing all of these samples. The calculator can then calculate a number of samples in advance each time the machine tool almost uses up the samples which have been generated.

It should be noted that the successive quantity $X_{n-1}, X_{S1}, ---X_n$, may be rather large quantities, since they are the absolute coordinates of the X servo, and the same situation exists with regard to the Y and Z servos, and they are also the accumulated digital displacement commands. In decimal form, for example, $X_{n-1}$ could be equal to 123.4567 inches, or even greater. In binary form, which is the most efficient form for most digital computers, a seven decade decimal quantity such as is indicated, would be expressed as a word 21 bits in width or a 21 bit word. While this can be handled, it is really not necessary, and, in fact, it is useless to send the complete binary form of $X_{n-1}, Y_{n-1}, Z_{n-1}$, etc., out to the digital-to-analog converters and then the servos for the reason that the phase detector of the servo can only recognize the time difference between the position phase from the resolver and the command phase up to a maximum difference of plus or minus 2,500 microseconds. If the command phase should differ from the position phase by + 3,000 microseconds, it would appear to the phase detector exactly the same as − 2,000 microsecond command phase. Beyond the difference of plus or minus 2,500 microsecond, the system is ambiguous. The phase detector can only recognize 1,000 discrete time positions which are achieved by dividing the 5,000 microsecond input into the command counter by 1,000.

Since 1,000 discrete time positions can be completely defined within a binary word 10 bits wide, as $2^{10} = 1,024$, it is only useful and necessary to transmit to the digital-to-analog converter of the numerical machine tool control, the least significant 10 bits of the absolute commanded locations produced by the interpolation process which has been discribed. Any more data would not be utilized and therefore would be wasted. Thus, the digital-to-analog converter which is positioned before a phase detector should receive at one input the cyclic 200 cps reference carrier and at its other input the ten bit absolute commanded position word. At its output to the phase detector the converter must produce a square wave which is the 200 cps carrier delayed by 5 microseconds for each unit represented in the commanded word. Thus, if $X_{n-1} = 0.0014$ inch = 1110 in binary format, the digital-to-analog converter must produce an output wave delayed by 70 microseconds from the input wave for as long as $X_{n-1}$ remains the commanded position. In a system which runs at 10 samples per seconds, $X_{n-1}$ will remain as an input command for one-tenth of a second after which it will be replaced by $X_{S1}$, etc.

Figure 3:
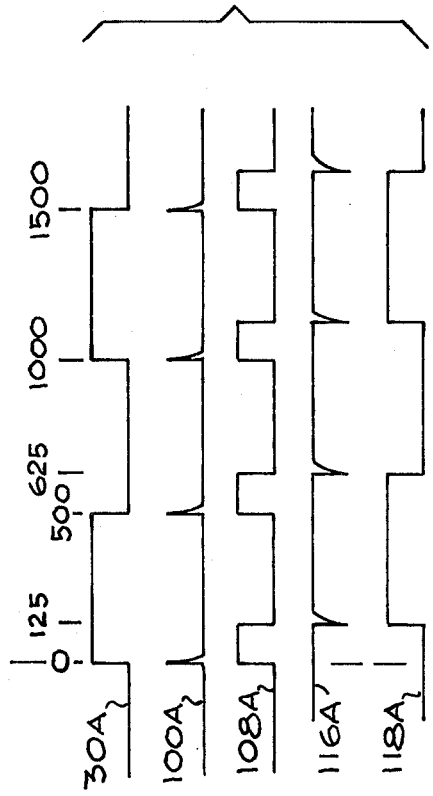
FIG. 3 is a waveform diagram, shown to assist in an understanding of the invention.
Figure 2:
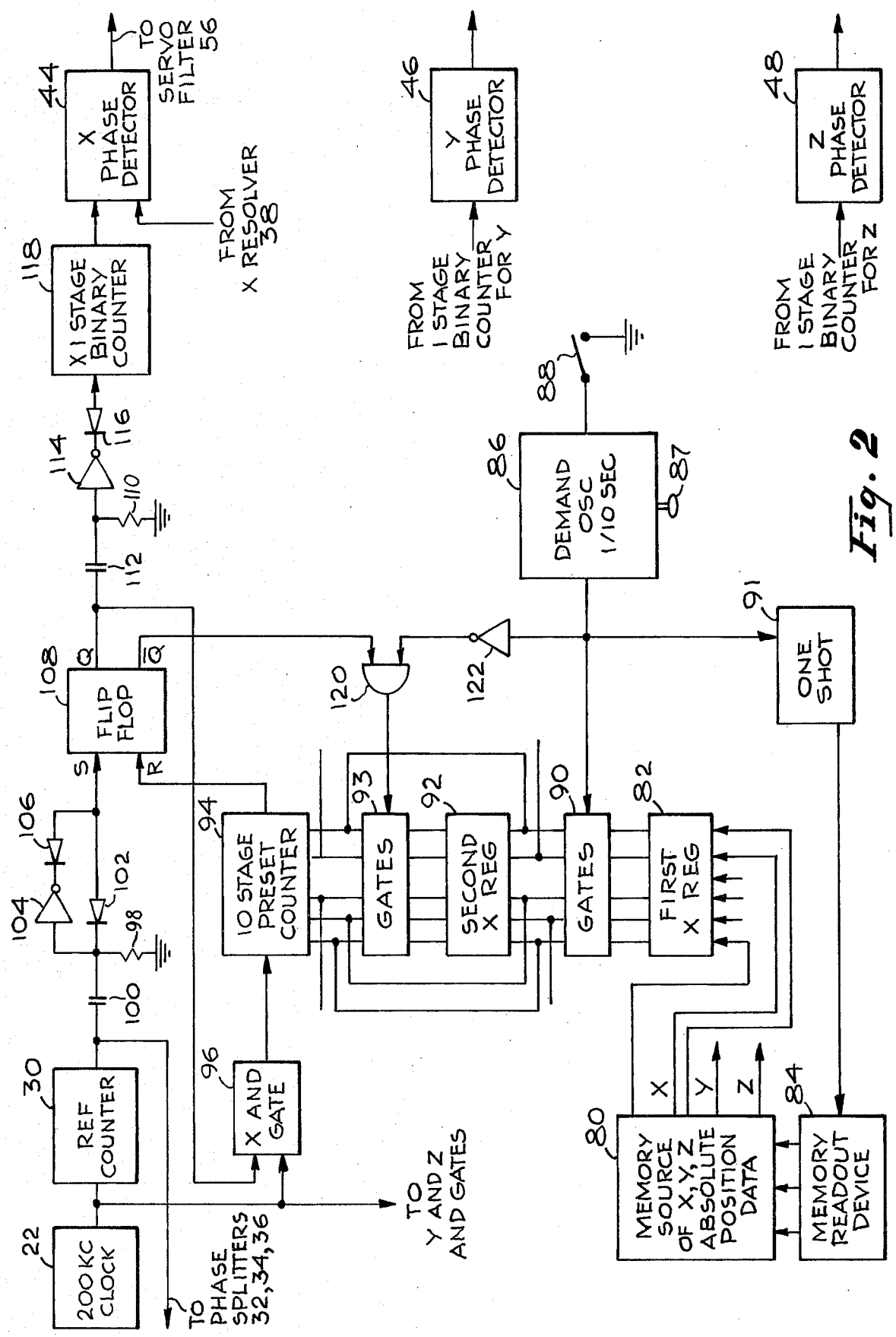
FIG. 2 is a block schematic diagram representative of an embodiment of the invention.

A block diagram exemplary of the essential digital-to-analog conversion in accordance with this invention and which carries out the foregoing is shown in FIG. 2, and a waveform diagram to assist in an understanding of the operation of FIG. 2 is shown in FIG. 3.

In FIG. 2, structures performing the same functions as those shown in FIG. 1 have similar reference numerals applied thereto.

A source of X, Y and Z absolute position data 80, as represented by a rectangle in the drawing, may comprise a memory system, such as magnetic tape, punched tape, magnetic disc, or a computer main frame memory in which there has been stored at the absolute position data for each regular increment of time, which has been calculated in the manner just described. Alternatively, this can be a computer with part end point information and feed rate information which can be used to compute path end point at the end of each regular increment of time, such as one-tenth of a second. These end points are computed several at a time so that there is a sufficient number to keep the machine tool from stopping and waiting for additional path information. In this manner, the load on the computer memory is minimized.

At the outset, the locus of the first end point for each axis at the end of the first one-tenth of a second interval, expressed as 10 digits for X, 10 digits for Y, and 10 digits for Z, is loaded into a register for each axis. Only the structure for the X axis will be represented herein. The structure required for the Y and Z axes is similar to the structure which will be described for the X axis and will be readily understood from the description which follows.

A demand oscillator, 86, is provided. It has an output frequency of 10 cycles per second, whereby each square wave output occurs at the rate of a pulse each one-tenth of a second. However, for feed rate override its frequency can be varied by a control 87. The oscillator is caused to commence operation by closing a switch 88. The output of the demand oscillator causes a one-shot circuit 91 to apply a pulse, after a suitable delay, to the memory read-out device 84 whereby it is ended to transfer out the first X, Y and Z coordinates of the end point desired, at the expiration of the first one-tenth of a second. These are also designated herein as "location words." The X location word is entered into the first X register 82. It is a 10 binary bit number. Upon the occurrence of the next pulse output from the demand oscillator 86, gates 90 are enabled to transfer the contents from the first X register 82, to a second X register 92. Simultaneously therewith, the gates 90 enter the contents of the first X register 82 into 10 stage preset counter 94. This is a countdown counter. It may be a count-up counter if the location word is entered in its complementary form. The one shot circuit provides an output to the memory read-out circuit 84, shortly after the transfer of the location word from the first to the second register, which causes a read out from memory of the next set of location words. The word for the X axis is entered into the first X register in place of the word which was transferred out.

The 200 kc clock 22 provides an output to the reference counter 30, as was shown in FIG. 1, and also to an X AND gate 96, (as well as to Y and Z AND gates not shown). The output of the reference counter 30, which constitutes the wave shape 30A shown on FIG. 3, is a 200 cps output or one which provides output square waves with a 5,000 microsecond period. This is applied to a differentiating circuit, constituting a series connected capacitor 98, and a shunt connected resistor 100. A first diode 102 is connected to the junction of the resistor and capacitor to pass only the pulses generated in response to the trailing edge of the pulses applied to the differentiating circuit. An inverter 104 is connected to the junction of the resistor and capacitor. Its output is applied to a second diode 106. As a result of the poling of the second diode connection and the presence of the inverter, positive going output pulse is provided only in response to the leading edge of each pulse applied to the differentiating circuit. As a result, a wavetrain having the waveform 100A, shown in FIG. 3, is obtained. This comprises a first positive going pulse which substantially coincides with the leading edge and a second positive going pulse which coincides with the trailing edge of the pulses constituting the output of the reference counter 30.

The output of the differentiating circuit and its associated network is applied to the set input of a flip flop 108. Each time it receives a pulse from the output of the differentiating network, the flip flop is driven to its set state. Each time the flip flop 108 is driven to its set state, it provides a Q output both to the AND gate 96 and to a second differentiating network which constitutes a series connected capacitor 110 and a parallel connected resistor 112.

The Q output of flip flop 108 is represented by the waveform 108A in FIG. 3. AND gate 96 is enabled by the Q output whereby it can pass 200 kc clock pulses from the clock 22 to the 10 stage preset counter 94 causing it to count down. When the preset counter counts down to zero, it provides an output to the reset input of the flip flop 108, causing it to be reset whereby its $\bar{Q}$ output goes high and its Q output is terminated. The pulse width of the Q output of flip flop 108, as a result, is determined by the time required to count through the number in the preset counter 94. On the assumption that the number was a number such as 125, the width of the Q pulse of flip flop 108 is 5 microseconds × 125 or 625 microseconds.

The output of the differentiating network constituting resistor 110 and capacitor 112 is applied to an inverter 114, and thereafter to a diode 116. The diode only passes negative going pulses. When the Q output pulse of flip flop 108 is differentiated, its trailing edge provides a positive going pulse which is inverted by inverter 114 to a negative going signal. This can be applied by diode 116 to a one stage binary counter 118. The output of diode 116 is represented by waveform 116A in FIG. 3. This trailing edge pulse is delayed with respect to the leading edge of the reference counter by 625 microseconds. The one-stage binary counter 118, in response to this pulse generates an output square wave, as represented by the waveform 118A in FIG. 3. The binary counter output square wave is terminated when it receives a second output from the diode 116.

The foregoing shows how the system described generates square waves whose leading edges trail the leading edge of the reference counter square by 5 microseconds × the number in the preset counter. The number in the preset counter equals the commanded location number. Thus, the command pulse applied to the X phase detector by the output of the one stage binary counter 118 has a phase delay as determined by the point to which the X slide must move within one-tenth of a second.

Since the 10 stage preset counter 94 is only permitted to count down from 1,000, in those instances where the number in the preset counter is less than 1,000, the counter would count down to zero in less than one-tenth of a second and it could very well be possible that the servo motors have not moved the slides of the table to the position called for by the numbers in the preset counters. Therefore, in order to insure that the machine tool table continues to move to the location called for, the command number which is in the second X register is transferred, by means of the gates 93, into the preset counter 94 whenever flip flop 108 is reset and produces a $\bar{Q}$ output. Flip flop 108 receives an output from preset counter 94 when it attains its zero count state. At that time, the $\bar{Q}$ output of flip flop 108 is applied to an AND gate 120. An enabling input to this AND gate is received from an inverter 122. The inverter is connected to receive an output from the demand oscillator, which occurs every one-tenth of a second. In the absence of this output, AND gate 120 enables gates 93 and the number which is in the second X register 92 is used to preset the 10 stage counter 94 again. In the presence of an output from the demand oscillator 86, inverter 122 prevents AND gate 120 from enabling gates 93, since at that time the contents of the first X register are desired to be transferred into the 10 stage preset counter 94 and not the contents of the second X register 92.

When demand oscillator 86 generates a one-tenth of a second output pulse, in addition to enabling gates 90 and disenabling gates 93, it enables one-shot 91 to generate an output after a slight delay interval. The delay interval is to enable the first X register 82 to transfer its contents into the second X register. At the end of the delay interval, the memory read-out device 84 is enabled to read out the succeeding location number into the first X register 82.

From the foregoing description, it should be appreciated that command or location numbers are entered into the preset counters for the three axes substantially simultaneously, and that the three axes counters commence counting simultaneously and thereby commence to generate the phase delayed command square waves simultaneously. As a result, the problem of time skew between the three axes is avoided.

The problem of losing one or more command pulses which can lead to an accumulative error, in the prior art machine tool control system, cannot occur with the system described herein, since on the assumption that the machine tool is not provided at the end point specified in the preset counter at the end of a one-tenth of a second interval, the phase detector 44 will detect a greater phase error between the position of the slide and the next number in the preset counter and thus the machine tool will move with a higher acceleration in view of the greater phase error to attain the next end point in the succeeding one-tenth of a second.

In the event that a very sharp change in path direction occurs at a certain point, and it is desired to insure that the machine tool reach the point from which there is a sharp change, and in the event that the inertia of the system is such that it may not reach that point within the last one-tenth of a second alloted thereto, this invention may be made to compensate for such a situation by repeating the X, Y and Z numbers defining the particular point for as many times as is required to insure the attainment of the particular point in the path. Obviously, when the machine tool reaches that particular point, should this occur before the last of these identical numbers has been used up, the phase detector will detect a zero phase variation between the pulse signal received from the one-stage binary counter and the signal received from the resolver and thus the slides will stand still until the next output from the demand oscillator operates to change the numbmer in the preset counter 94.

From the foregoing description, it will be seen that a novel, useful and improved motion command generating system for a numerically controlled machine tool has been described and shown.

The embodiments of the invention in which an exclusive property or privilege is claimed are defined as follows:

1. A numerical control system for commanding slide motion along each axis of a machine tool comprising, for each axis,
   means for generating successive absolute location number signals representative of successive locations to which the slide for an axis must move within successive, identical, predetermined intervals,
   means for generating successive reference time signals spaced apart by said identical predetermined intervals,
   means responsive to successive absolute location number signals and successive reference time signals for generating successive command signals wherein each command signal is phase delayed from a reference time signal by an amount representative of a location number value,
   means for generating a slide signal having a phase delayed from said reference by an amount representative of the distance of said slide from a reference location,
   a phase detector,
   means for successively applying said command signals and said slide signals to said phase detector to produce an output signal having a phase representative of a phase difference of its inputs, and
   means responsive to the output of said phase detector for moving said slide in a direction to minimize said phase difference.

2. A numerical control system as recited in claim 1, wherein said means for generating successive location number signals representative of successive locations to which the slide for an axis must move within successive identical predetermined intervals, includes
   a source of said location numbers,
   a register means,
   means for generating a demand signal at the end of each of said predetermined intervals, and
   means for transferring a location number from said source to said register means responsive to a demand signal.

3. A numerical control signal as recited in claim 2, wherein said means for generating command signals includes
   flip flop means having set and reset states,
   means for driving said flip flop means to its set state responsive to each reference time signal,
   means responsive to the location number in said register means and to the output of said flop flop means when in its set state to generate a reset pulse at an interval after said first pulse determined by a location number value,
   means for driving said flip flop means to its reset state responsive to a reset pulse, and
   means responsive to each set output of said flop flop means for generating a command signal having a width determined by the interval between set outputs.

4. A numerical control system as recited in claim 3, wherein said means responsive to the location number in said register and to the output of said flip flop means when in its set state to generate a second pulse at an interval after said first pulse determined by said location number value includes
   a counter means,
   means responsive to a demand signal for transferring the location number in said register means into said counter means,
   a source of clock pulses, and
   gate means responsive to the set output of said flip flop means for enabling said counter means to count responsive to clock pulse from said source, and to generate a second signal when it has counted through said location number.

5. In a numerical control system in which data is supplied for commanding slide motion along each one of the axes of a machine tool in the form of successive absolute location numbers which define successive loci along a path which must be reached by all axes within simultaneously generated successive equal predetermined intervals comprising, for each axis of said numerical control system,
   a phase detector,
   means to generate slide position square wave signals, each having a phase displaced from a reference representative of the location of the machine tool slide with respect to a reference location,
   means to apply slide square wave signals to said phase detector,
   means responsive to said absolute location numbers to generate command square wave signals, each command square wave signal having a phase displaced from said reference by an amount representative of the value of said absolute location number,
   means for applying said command square wave signals to said phase detector to enable said phase detector to detect the difference in phase between each said command and said slide position signals, means responsive to the phase difference detected by the phase detector for each axis to move the respective slide for each axis to minimize said phase difference, and means operative at the end of said predetermined interval to replace said first of said location numbers with the next one of said location numbers.

6. In a system as recited in claim 5 wherein said means for generating command square wave signals each having a phase displaced from a reference comprises flip flop means having set and reset states, means for generating a first pulse at each reference phase time, means for applying said first pulse at each reference phase time to said flip flop means to drive said flip flop means to its set state in response to each of said pulses, means responsive to a location number to generate a second pulse at a time spaced from said reference phase time by an interval having a duration representative of the location number value, means for resetting said flop flop means responsive to said second pulse, means for deriving from the said output of said flip flop means a third pulse signal occurring at the trailing edge of the said output of said flip flop means, binary counter means, and means for driving said binary counter means responsive to said trailing edge pulse output of said means whereby the output of said binary counter means constitutes command pulse outputs.

7. In a system as recited in claim 6 wherein said means for generating a first pulse at each reference phase time includes a source of clock pulses, reference counter means to which clock pulses from said source are applied for producing reference pulses in response thereto, differentiating circuit means to which said reference pulses are applied, means for deriving from said differentiating circuit a first pulse in response to the leading and trailing edge of a reference pulse applied to said differentiating circuit.

8. In a system as recited in claim 7 wherein said means responsive to a location number to generate a second pulse at a time spaced from said reference pulse time by an interval having a duration representative of the location number, includes counter means, means to cause said counter to assume a count state representative of said location number, means responsive to said flip flop means being driven to its set state to apply clock pulses from said source to said preset counter means to cause said counter to count and provide a second pulse output when it has counted through said location number, and means responsive to the output of said flip flop means when it is reset to terminate further application of clock pulses to said preset counter means.

9. In a numerical control system for a machine tool, the improvement comprising, means for each axis, for generating successively absolute location numbers which define successive loci along a path which must be reached by a slide within successive equal predetermined intervals, a preset counter means for each axis, means for each axis for entering absolute location numbers successively into the respective preset counter means for each axis at the end of each predetermined interval, a source of clock pulses for all axes, means for all axes for converting clock pulses from said source into a reference square wave signal train, flip flop means for each axis having a set and reset state, means for driving the flip flop means for each axis to its set state in response to the leading and trailing edge of each square wave in said reference pulse train, means for each axis responsive to the output of said flip flop means when in its set state for enabling the respective preset counter means for each axis to be driven responsive to clock pulses from said clock pulse source, means responsive to the preset counter means for each axis being driven to a count state indicative of having counted through the value of a location number to reset said respective flip flop means for each axis, a binary counter means for each axis, means for deriving from the flip flop means of each axis a signal having a duration representative of the interval during which the respective flip flop means is maintained in its set state, and means for driving the binary counter means for each axis in response to the trailing edge of the respective signals representative of the respective intervals over which the flip flop means for each axis is in its set state to produce a command square wave signal for each axis having a phase delayed from a reference phase in an amount representative of the location number for each axis.

* * * * *